US009704291B2

(12) United States Patent
Chen et al.

(10) Patent No.: US 9,704,291 B2
(45) Date of Patent: Jul. 11, 2017

(54) STRUCTURE MODEL CREATION FROM A THREE DIMENSIONAL SURFACE

(71) Applicant: HERE Global B.V., Veldhoven (NL)

(72) Inventors: Xin Chen, Evanston, IL (US); Xiang Ma, Chicago, IL (US); Hang Dou, Iowa City, IA (US)

(73) Assignee: HERE Global B.V., Eindhoven (NL)

( * ) Notice: Subject to any disclaimer, the term of this patent is extended or adjusted under 35 U.S.C. 154(b) by 197 days.

(21) Appl. No.: 14/075,017

(22) Filed: Nov. 8, 2013

(65) Prior Publication Data
US 2015/0130797 A1 May 14, 2015

(51) Int. Cl.
*G06T 17/05* (2011.01)
*G06T 17/10* (2006.01)
*G06K 9/34* (2006.01)
*G06K 9/00* (2006.01)
*G06T 17/20* (2006.01)
*G06T 7/10* (2017.01)

(52) U.S. Cl.
CPC .......... *G06T 17/05* (2013.01); *G06K 9/00637* (2013.01); *G06K 9/34* (2013.01); *G06T 7/10* (2017.01); *G06T 17/10* (2013.01); *G06T 17/20* (2013.01)

(58) Field of Classification Search
None
See application file for complete search history.

(56) References Cited

U.S. PATENT DOCUMENTS

| 6,208,347 B1 | 3/2001 | Migdal et al. |
| 8,284,190 B2 | 10/2012 | Muktinutalapati et al. |
| 8,466,915 B1 | 6/2013 | Frueh |
| 8,958,654 B1 * | 2/2015 | Evans et al. .................. 382/254 |
| 2004/0105573 A1 * | 6/2004 | Neumann et al. ............ 382/103 |
| 2004/0246252 A1 * | 12/2004 | Morrow et al. .............. 345/440 |
| 2010/0020066 A1 * | 1/2010 | Dammann ............. G06T 19/00 345/419 |

(Continued)

FOREIGN PATENT DOCUMENTS

| EP | 0505077 | 9/1992 |
| WO | WO2010106018 | 9/2010 |

OTHER PUBLICATIONS

Wang, Zheng, and T. Schenk. "Extracting building information from LIDAR data." International archives of photogrammetry and remote sensing 32.3/1 (1998): 279-284. http://citeseerx.ist.psu.edu/viewdoc/download?doi=10.1.1.50.8154&rep=rep1&type=pdf.*

(Continued)

Primary Examiner — Tize Ma
(74) Attorney, Agent, or Firm — Lempia Summerfield Katz LLC

(57) ABSTRACT

Constructing a three dimensional (3D) model of a structure may involve receiving a 3D surface representing a geographic area, the surface having elevation values associated with points of the surface and the geographic area comprises a structure having a geographic footprint smaller than the geographic area. Constructing a 3D model may also involve projecting the elevation values into a two dimensional (2D) plane. Further, a 3D model may be constructed of the structure by assigning model heights based on the elevation values projected into points of the 2D plane.

19 Claims, 8 Drawing Sheets

(56) References Cited

U.S. PATENT DOCUMENTS

2010/0166294 A1* 7/2010 Marrion et al. ............... 382/154
2010/0284607 A1 11/2010 Van Den Hengel et al.

OTHER PUBLICATIONS

Gorte et al., Representation and Reconstruction of Triangualr Irregular Networks with Vertical Walls, 2012, pp. 15-19, vol. 38, No. 4C26, ISPRS Archives.
Partial European Search Report cited in EP14187857, mailed Sep. 18, 2015.
Rahman, Digital Terrain Model Data Structures, Aug. 27, 2015.
Sirmacek et al., Performance Evaluation for 3D City Model Generation of Six Different DSMs for Air and Spaceborne Sensors, Feb. 1, 2012, pp. 59-70, vol. 5, No. 1, IEEE Journal of Selected Topics in Applied Earth Observations and Remote Sensing.
Weibel et al., Digital Terrain Modeling, Jan. 1991, pp. 269-297, Geographical Information Systems: Principles and Applications.
European Search Report and Written Opinion cited in EP14187857.9, mailed Feb. 24, 2016.
Leberl et al., Recognizing Cars in Aerial Imagery to Improve Orthophotos, 2007, Proceedings of the 15th Annual ACM International Symposium on Advances in Geographic Information Systems.
Stannard et al., Recognising 2-D Shapes from Incomplete Boundaries, 1999, IEEE Colloquium on Applied Statistical Pattern Recognition.
Sun et al., Contextual Models for Automatic Building Extraction in High Resolution Remote Sensing Image Using Object-Based Boosting Method, 2008, pp. 437-440, vol. 2, IEEE International Geoscience and Remote Sensing Symposium, Piscataway, NJ.
Wang et al., Extracting Building Information for Lidar Data, 1998.

* cited by examiner

STRUCTURE MODEL CREATION FROM A THREE DIMENSIONAL SURFACE

BACKGROUND

The following disclosure generally relates to structure model creation and, more particularly, to structure model creation from a three dimensional surface mesh representing a geographic area.

Geographic mapping and modeling systems may include three dimensional (3D) models of structures in a geographic area to provide an augmented experience for a user. Some geographic areas, such as metropolitan areas, may involve numerous structures over a large geographic area. Manually creating 3D models for each structure in a metropolitan geographic area may be very labor intensive.

SUMMARY

In an embodiment, a non-transitory computer readable medium includes instructions that when executed on a computer are operable to receive a three dimensional (3D) surface representing a geographic area. The surface has elevation values associated with points of the surface, and the geographic area comprises a structure having a geographic footprint smaller than the geographic area. The instructions may also be operable to project the elevation values into a two dimensional (2D) plane, and construct a 3D model of the structure by assigning model heights based on the elevation values projected into points of the 2D plane.

In an embodiment a method involves receiving a 3D surface representing a geographic area, the surface having elevation values associated with points of the surface and the geographic area comprises a structure having a geographic footprint smaller than the geographic area. The method also involves projecting the elevation values into a two dimensional (2D) plane. The method also involves generating an intensity image based on the elevation values of the 2D plane, segmenting the intensity image, and detecting a shape representing the geographic footprint of the structure in the geographic area from the segmented intensity image. Further, the method may involve constructing a 3D model of the structure by assigning heights to the shape based on the elevation values projected into points of the 2D plane corresponding to the shape.

In an embodiment, an apparatus includes at least one processor and at least one memory including computer program code. The at least one memory and the computer program code are configured to, with the at least one processor, cause the apparatus at least receive a 3D surface representing a geographic area, the surface having elevation values associated with points of the surface and the geographic area comprises a structure having a geographic footprint smaller than the geographic area. The at least one processor may also cause the apparatus to project the elevation values into a two dimensional (2D) plane. The at least one processor may also cause the apparatus to generate an image based on the elevation values of the 2D plane, segment the image, and detect a shape representing the geographic footprint of the structure in the geographic area from the segmented image. The at least one processor may further cause the apparatus to construct a 3D model of the structure by assigning heights to the shape based on the elevation vales projected into points of the 2D plane corresponding to the shape.

BRIEF DESCRIPTION OF THE DRAWINGS

Exemplary embodiments of the present invention are described herein with reference to the following drawings.

DETAILED DESCRIPTION OF THE PRESENTLY PREFERRED EMBODIMENTS

Data acquisition techniques, such as Light Detection and Ranging (LIDAR) or photogrammetry methods, may be used to develop a three dimensional (3D) surface representing an entire geographic area, however, the data may involve one continuous surface that does not delineate the structures that exist in the geographic area from the rest of the 3D surface. Structures may be delineated from the rest of a 3D surface representing a geographic area using various techniques. In an embodiment, elevation data of a 3D surface representing a geographic area are projected into a two dimensional (2D) plane. The 2D plane may be processed to segment shapes corresponding to the structures in the geographic area. These shapes may then be assigned a height according to the elevation data for the shapes from the 2D plane to define 3D points for the structure. A 3D model of a structure may be constructed by connecting the defined 3D points for the structure with edges, faces or surfaces of a 3D model.

A constructed 3D model of a structure may be positioned with other 3D models in a geographic mapping or modeling system according to an associated geographic location of the source structure for the constructed 3D model. Accurately representing geographic areas may involve collections of multiple structure 3D models. 3D models and collections of 3D models may be used in mapping, navigation, or enhanced reality applications where more detailed information regarding a geographic area may be desired, or required. Automatically constructing the 3D models of structures, as opposed to manually constructing 3D models, significantly reduces the resources required to create collections of 3D models required to accurately describe geographic areas, particularly metropolitan areas where the density of structures may be very significant.

Figure 1:
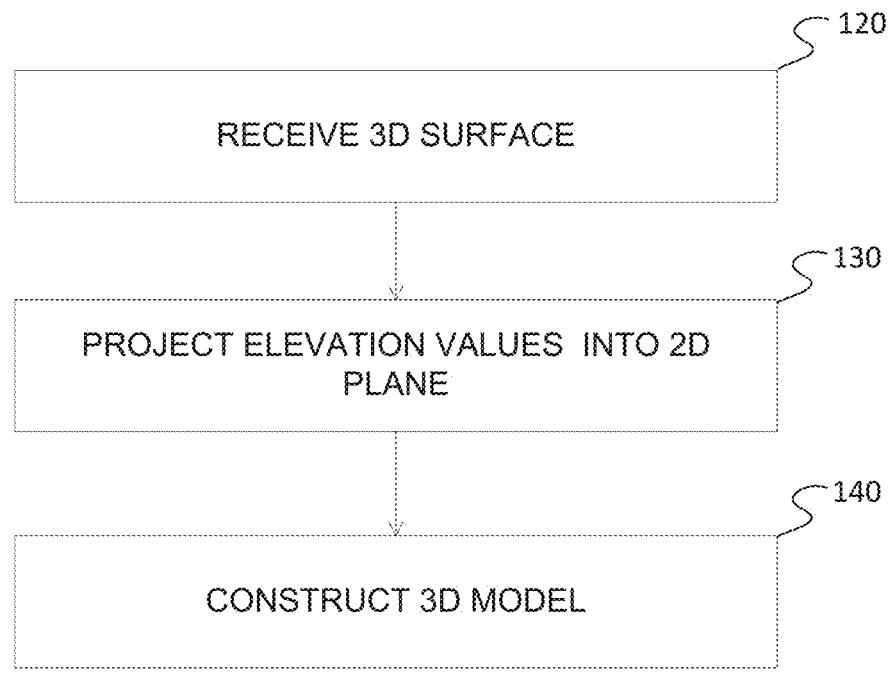
FIG. 1 illustrates an example embodiment for structure model creation.

FIG. 1 is a diagram illustrating an embodiment for structure model creation. In an embodiment, the embodiment may be implemented as computer program logic or computer readable program code stored in the memory and/or storage of a computer or system, such as the system 400 described below with respect to FIG. 4, and executable by one or more processors thereof to cause the system 400 to implement the disclosed functionality.

At act 120 a three dimensional (3D) surface representing a geographic area is received. The surface has elevation values associated with points of the surface. Also, the geographic area includes a structure having a geographic footprint, outline, or boundary smaller than the geographic area.

The geographic area may be any geographic area. For example, the geographic area may be a metropolitan area with multiple structures such as Chicago, Ill. The geographic area represented may be any size. For example, the geographic area may be limited to an area surrounding a single structure, or the geographic area may be much larger and encompass an entire metropolitan area or region. The structure may be any type of structure such as a building, wall, or other manmade or natural structure.

The 3D surface may be any 3D surface. For example, the 3D surface may be the visible layer of a 3D model of a geographic area constructed from aerial imagery and assigned geographic coordinates combined with elevation data for particular points in the imagery. The elevation data may be extracted from the photographs directly using photogrammetry and/or stereoscopic techniques, or any other technique capable of extracting elevation data from an image of a geographic area. The elevation data may also be devised using LIDAR techniques. LIDAR, also known as LiDAR, Lidar, or other similar representations, is a remote sensing technology that measures distance by illuminating a target with a laser and analyzing the reflected light. Typically LIDAR uses ultraviolet, visible, or near infrared light to image objects and can be used with a wide range of targets. In an embodiment, a LIDAR data acquisition system may be attached or otherwise integrated with a vehicle. There may also be a positioning system integrated with the LIDAR vehicular system such as a Global Positioning System (GPS) to provide a base reference for the data acquired by the LIDAR system. For example, an airplane outfitted with appropriate geographic positioning equipment may also have photography and LIDAR capabilities. As the airplane flies over a geographic area the geographic location data, photographic data, and LIDAR data may be correlated to produce a 3D model representing the visible surface of the geographic area. Such a visible surface as depicted in a 3D model may be considered a 3D surface. A 3D model of a geographic area may not have individual structures of the geographic area delineated from other parts of the geographic area in the model. For example, even though a building may be visible in a model, there may be no distinction in the model or surface designating the building as separate from the rest of the model or surface.

At act 130 elevation values of the 3D surface are projected into a two dimensional (2D) plane. Projecting the 3D elevation values into a 2D plane may be done by any method. In an embodiment involving a 3D orthogonal coordinate system one of the dimension values, such as the vertical dimension value, may be considered an elevation or altitude of the point. One of the dimensions, such as the vertical dimension, may be removed from the coordinate values for each 3D data point of the 3D surface, thus leaving the 3D data points with only a 2D position description. Each 2D position may be associated with the vertical dimension removed from the initial coordinate values for the 3D surface point as a value for that point in a 2D plane. In this way, a 2D coordinated plane of elevation values may be created. Other projection techniques may be used as well.

The 2D plane may involve any two dimensions of a three dimensional space. For example, for a space defined by an X-Y-Z coordinate system, the Z, or vertical, dimension may be removed leaving only the X and Y coordinate dimensions in the X-Y plane, and an associated Z coordinate value as an elevation. The X-Y plane for the 2D plane may be placed relative at any position with respect to the Z axis. In an embodiment, a Z axis position corresponding with a ground level for a structure is used.

At act 140 a 3D model of the structure is constructed by assigning model heights based on the elevation values projected into points of the 2D plane. Any technique may be used for the construction of the 3D model. The 3D model in particular may be any 3D model capable of representing the structure. For example, electronic modeling techniques such as solid, shell, polygonal, curve, or digital sculpting model techniques may be used to represent the structure.

In an embodiment, the 2D plane may be analyzed for elevations corresponding to a structure. The 2D plane may be analyzed using any technique. For example, the location of the structure or the structure geographic footprint as represented in the 2D plane may be known. The elevation values in the 2D plane corresponding to the structure may be used to define 3D points of a model. The model may then be created by connecting the points with edges, curves, polygons, or surfaces to create a 3D model of the structure.

In an embodiment, a geographic footprint of a structure may not be known. The geographic footprint may be determined through an analysis of the 2D plane. For example, as structures generally involve a significant elevation change from the areas surrounding the structure, areas of the 2D plane where significant elevation changes occur may be determined. A collection of these elevation changes may be considered a geographic footprint of the structure. The collection may be contiguous so as to completely define a footprint of a structure, or discontinuous such that the existence of a geographic footprint of a structure may be implied or determined to a certain level of confidence to consider the collection of elevation changes a geographic footprint of a structure.

Figure 2:
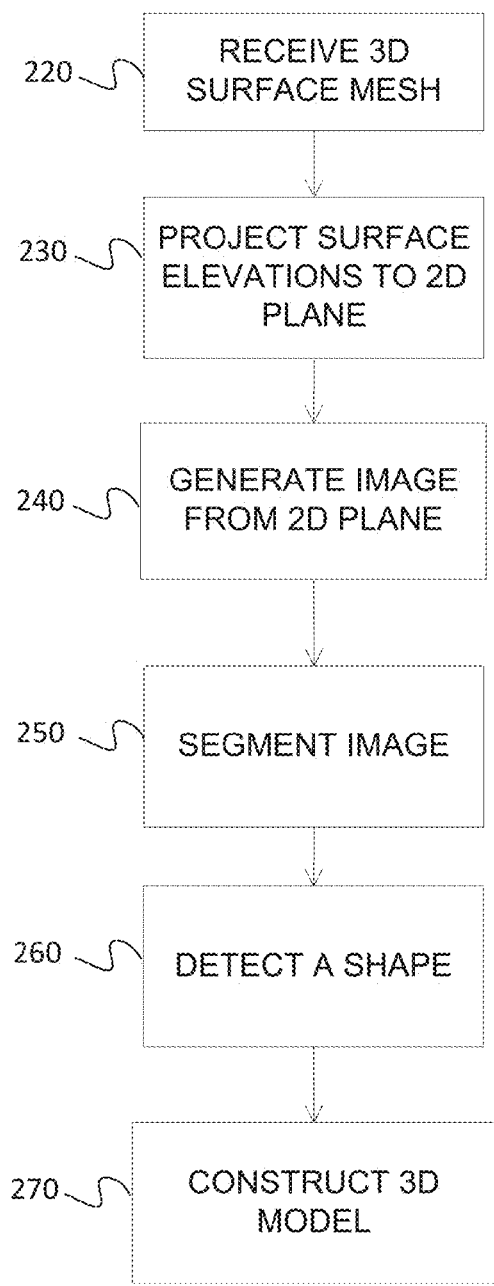
FIG. 2 illustrates another example embodiment for structure model creation.

FIG. 2 is another diagram illustrating an embodiment for structure model creation. More, fewer, or any combination of the acts indicated may be provided in an embodiment. In an embodiment, the method may be implemented as computer program logic or computer readable program code stored in the memory and/or storage of a computer or system, such as the system 400 described below with respect to FIG. 4, and executable by one or more processors thereof to cause the system 400 to implement the disclosed functionality.

In act 220 a three dimensional (3D) surface representing a geographic area is received. The surface has elevation values associated with points of the surface. Also, the geographic area involves a structure having a geographic footprint or structure perimeter smaller than the geographic area.

The 3D surface may be any surface capable of adequately describing the elevations of locations in a geographic area. In an embodiment, the 3D surface may involve a mesh of connected points. The points may be connected in any fashion. For example, the points may be connected to form polygonal elements that when assembled produce the mesh. The polygonal elements may involve any shape of element. For example, triangular elements, rectangular elements, or hexagonal elements may be used.

In act 230 the elevation values are projected into a two dimensional (2D) plane. The elevation values may be projected using any method capable of adequately assigning geographic elevation values to coordinated points of the 2D grid.

In an embodiment involving a polygonal element 3D surface, an average elevation value may be determined for the polygonal element and associated with the area of the 2D plane representing the polygonal element. The average elevation may be determined by any method. In an embodiment the average elevation may be determined by determining the average of the defining mesh points of the 3D surface mesh. For example, the average of the three bounding points in a triangular mesh may be determined as the average elevation for the triangular element. Also, assigning the average elevation of the element may be performed using any technique. In an embodiment, the average may be assigned to a centroid of the element, as represented in the 2D plane. In an embodiment, integrated iterations of elements may be created and have elevations assigned. For example, a triangular element may have a determined centroid, and the existing bounding points may be connected to the centroid to form three elements from the original triangular element. In this manner, different resolutions of a mesh, or sizes of elements, may be used to refine elevation values as represented in a 2D plane.

In act 240 an image is generated based on the elevation values of the 2D plane. The image may be any image adequately representing the elevations of the 2D plane in a visible or quantitative manner. In an embodiment, an intensity image may be generated. An intensity image may be any image adequately displaying pixel intensity values in a manner proportional to the elevation values associated with the 2D plane. An intensity image may be represented as a grayscale image, color image, or any other representation. A grayscale image representation may involve darker hues of gray representing less intensity and lighter hues of gray involving more intensity. For example, a white pixel may represent a maximum intensity and a black pixel may represent a minimum of intensity. Image intensity may be quantified using any technique. For example, percentages of a maximum intensity may be used where 0% represents black and 100% represents white. Other techniques may be used as well. For example, brightness designations in pixel display format or a red-green-blue spectrum hierarchy for pixels may be used to indicate intensity.

The intensity of pixels in the image may be proportional to the elevation of corresponding points in the 2D plane. For example, a maximum and minimum elevation of the 2D plane may be determined and the intensity scale of the intensity image may be scaled proportionately with the maximum and minimum elevations. A pixel representing a maximum elevation value may be assigned an intensity of 100%, or shaded to pure white, whereas a pixel representing a minimum elevation of the 2D plane are represented in the image may have an intensity level of 0%, or be shaded black. Any elevations between the maximum and the minimum will be accorded a proportionate intensity level and corresponding pixel shade, hue, or color.

In act 250 the image is segmented. Segmentation may involve any segmentation technique operable to distinguish an area of the image representing elevation values of a structure from the rest of the image. For example, thresholding techniques, clustering techniques, compression-based techniques, region growing techniques, split-and-merge techniques, or any other segmentation technique may be used.

In an embodiment segmentation may be performed using edge detection techniques. Edge detection techniques may operate by identifying points in an image at which the image brightness changes sharply or has discontinuities. Any edge detection technique may be used, such as Canny edge detection based techniques, thresholding and linking techniques, edge thinning techniques, differently edge detection techniques, Hough transform techniques, feature detection techniques, and/or phase congruency based edge detection techniques. In an embodiment, edges of the image are detected and represented as lines in a new image, or the existing image.

In an embodiment segmentation may be performed using thresholding techniques. Thresholding techniques may operate based on pixel values of an image. Each pixel may have an assigned value that correlates to a color or shade. In a grayscale image, the scale from black to white may be set on a 0-250 value scale. Thresholding may involve setting a particular value, or multiple values, as a threshold. The threshold will operate to divide the pixels into groups defined by pixels having values above and below the threshold. For example, a threshold value of 50 may be established, and all pixels having a value below 50 are designated as black, and all pixels having a value above 50 may be designated as white. The white pixels may be determined to have elevation, and black pixels may be determined to not have elevation. Boundary white pixels representing the boundaries of structures may be determined. In an embodiment, a pixel may have 8 surrounding, or neighbor, pixels. As pixels within the boundary will be surrounded by pixels having similar elevation, or color, boundary pixels may be identified as pixels having at least one neighbor pixel that is black after thresholding. After determining boundary pixels, the boundary pixels may be traced or grouped based on other proximal boundary pixels. For example, a boundary pixel may be grouped with a nearest other boundary pixels. In an embodiment, a line model may be used to project and determine a boundary pixel grouping by fitting a line through determined boundary pixels. In an embodiment, resulting lines of an image constructed using thresholding techniques represent the boundaries of structures in an intensity image.

In act 260 a shape representing the geographic footprint of the structure in the geographic area is detected from the segmented intensity image. The shape may be detected using any technique. In an embodiment, a shape detection algorithm is applied to the segmented intensity image to detect a shape. The shape detection algorithm may involve any method of detection. For example, shape matching may be performed. Patterns of lines in a segmented image may form various readily recognizable shapes commonly seen as structure footprints, such as rectangles. An algorithm may identify parallel straight lines and corresponding intersection points to determine that an area bounded by the parallel lines forms a rectangle. Other shapes may be detected similarly.

In an embodiment, a segmented image may have lines in patterns forming various degrees of contiguous shapes. Some shapes may be fully formed, and other shapes may be only partially formed, or implied by the pattern of the lines. In such an embodiment, lines may be extrapolated to intersection points with other existing or extrapolated lines, and shapes may be detected based on the patterns resulting from the extrapolations. In an embodiment, shapes may be determined to a certain level of confidence that the shape actually exists. The level of confidence may be quantified using any method. For example, the percent of a shape that required extrapolation to form the shape may be used as a quantification of confidence level. The confidence level may be compared to a pre-determined confidence threshold to determine if the pattern is a detected shape. For example, a pattern requiring one half of one side to be extrapolated to complete a square may be determined to be a square to a confidence level of 87.5%. If a pre-determined threshold for shape determination is 70%, the confidence level meets the threshold and the pattern is determined to be a detected shape.

In act 270 a 3D model of the structure is constructed by assigning heights to the shape based on the elevation values projected into points of the 2D plane corresponding to the shape. The 3D model may be constructed, built, or otherwise devised using any 3D modeling technique. In an embodiment, the constructed 3D model of the structure may be a 3D model of a building located in the geographic area along with other 3D models of structures, together making a 3D model of the entire geographic area, with each structure delineated individually from the collective 3D model of the geographic area. In this way, an augmented reality may be created, or presented, to a user using a device capable of displaying and manipulating the model. A constructed 3D model of a structure may also be displayed individually to a user, without other structures, to provide the user with an augmented experience of viewing a virtual representation of the structure itself.

FIGS. 3A-3F depict a 3D model created from a 3D surface of a geographic area.

Figure 3A:
FIG. 3A depicts an example three dimensional (3D) surface of a geographic area.
Figure 3B:
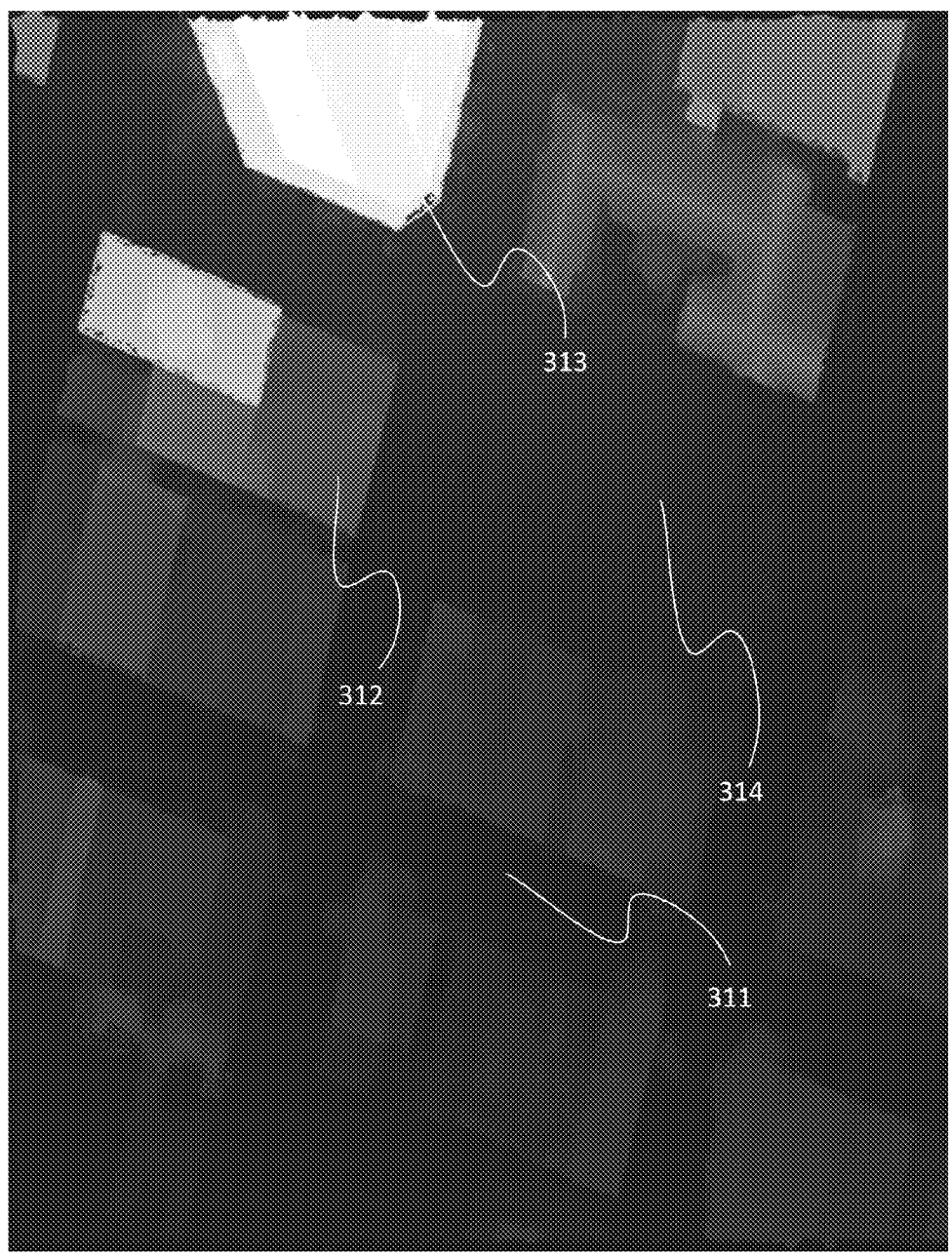
FIG. 3B depicts an example image generated from elevation data of the 3D surface of FIG. 3A.
Figure 3D:
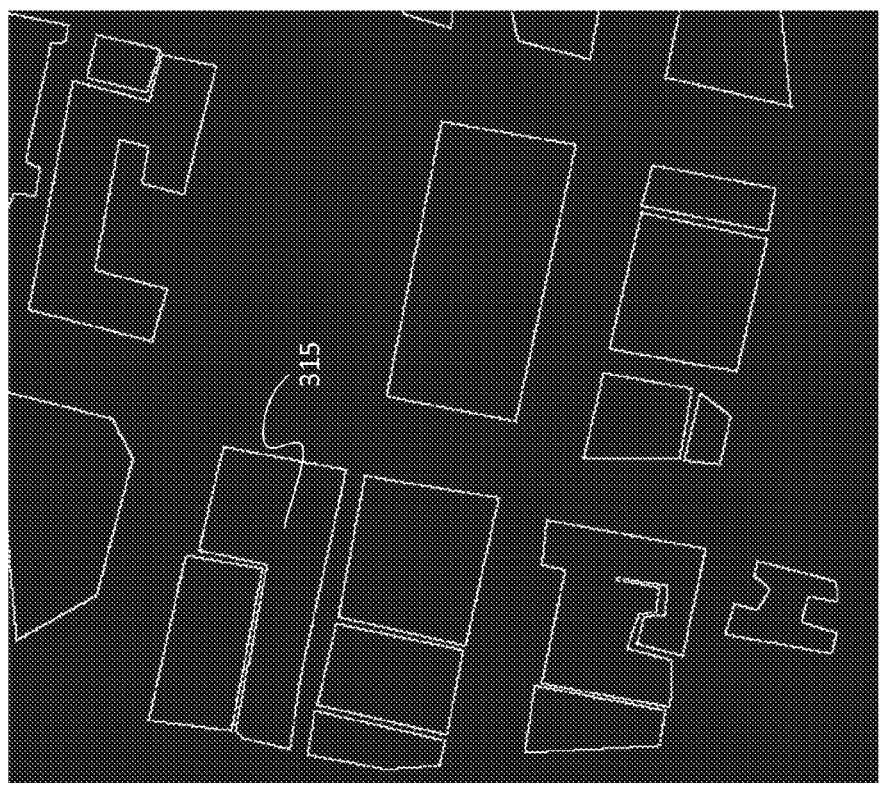
FIG. 3D depicts a segmentation of the image of FIG. 3B using a thresholding technique with merged pixels.
Figure 3C:
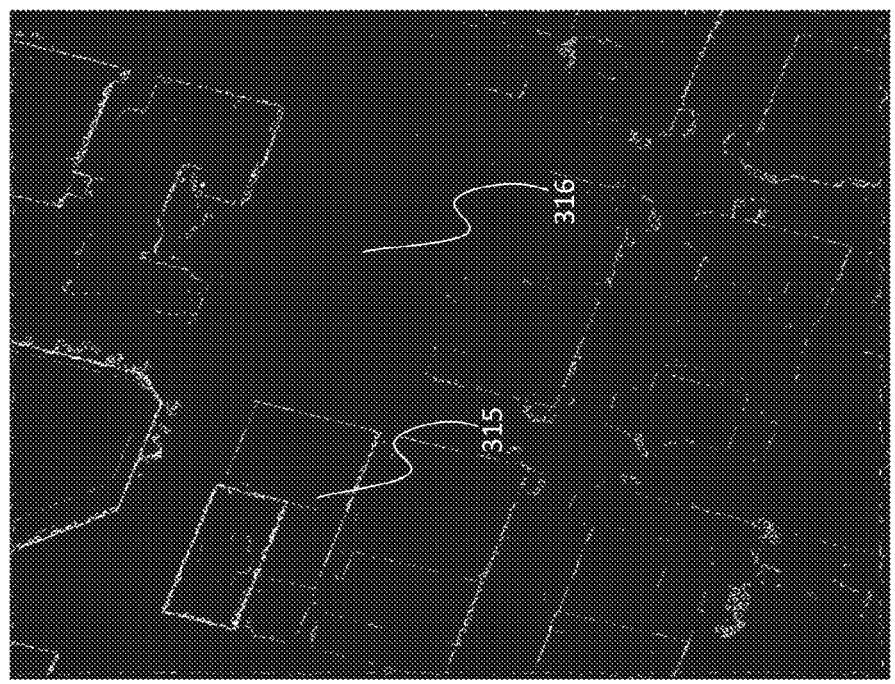
FIG. 3C depicts a segmentation of the image of FIG. 3B using an edge detection technique.
Figure 3E:
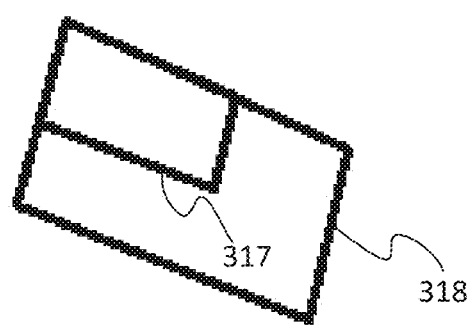
FIG. 3E depicts a detected shape from a segmentation.

FIG. 3A depicts a 3D surface 305 representing a geographic area having a structure 310 as well as a parking lot 309. The structure 310 has associated elevation values, whereas the parking lot 309 does not. Aerial imagery is used in this particular 3D surface. The aerial imagery shows multiple structures, however, none of the structures are actually delineated as a separate model in the 3D surface 305. FIG. 3B depicts a grayscale intensity image based on elevations determined from the 3D surface. The intensity image shows areas of high elevation with high intensity white coloration 313, and areas of low elevation with low intensity coloration 311. As can be seen from FIG. 3B, the structure 310 is represented by a an area of the image 312 having lighter, more intense, hues of gray than an area of the image 314 representing the parking lot 309. FIG. 3C depicts a segmentation of the intensity image of FIG. 3B using an edge detection technique. The segmentation shows lines in positions that represent the edges of structures having elevations in the 3D model 305, and hence represented by higher intensity gray hues in FIG. 3B. A collection of lines in the area of the image representing the structure 310 creates a pattern 315. As can be seen from FIG. 3C, no lines are present in the area of the image representing the parking lot 309. FIG. 3D depicts a segmentation of the intensity image of FIG. 3B using a thresholding technique with merged pixels. FIG. 3E depicts a shape detected from the pattern of lines 315 in FIG. 3C or FIG. 3D. In this case, the detected shape 318 includes another detected shape 317 inset in the other detected shape 318. The multiple shapes 317 and 318 may be considered a singular shape representing a singular structure. In this way, complex structures having different elevations for different parts of the structure may be identified or detected.

Figure 3F:
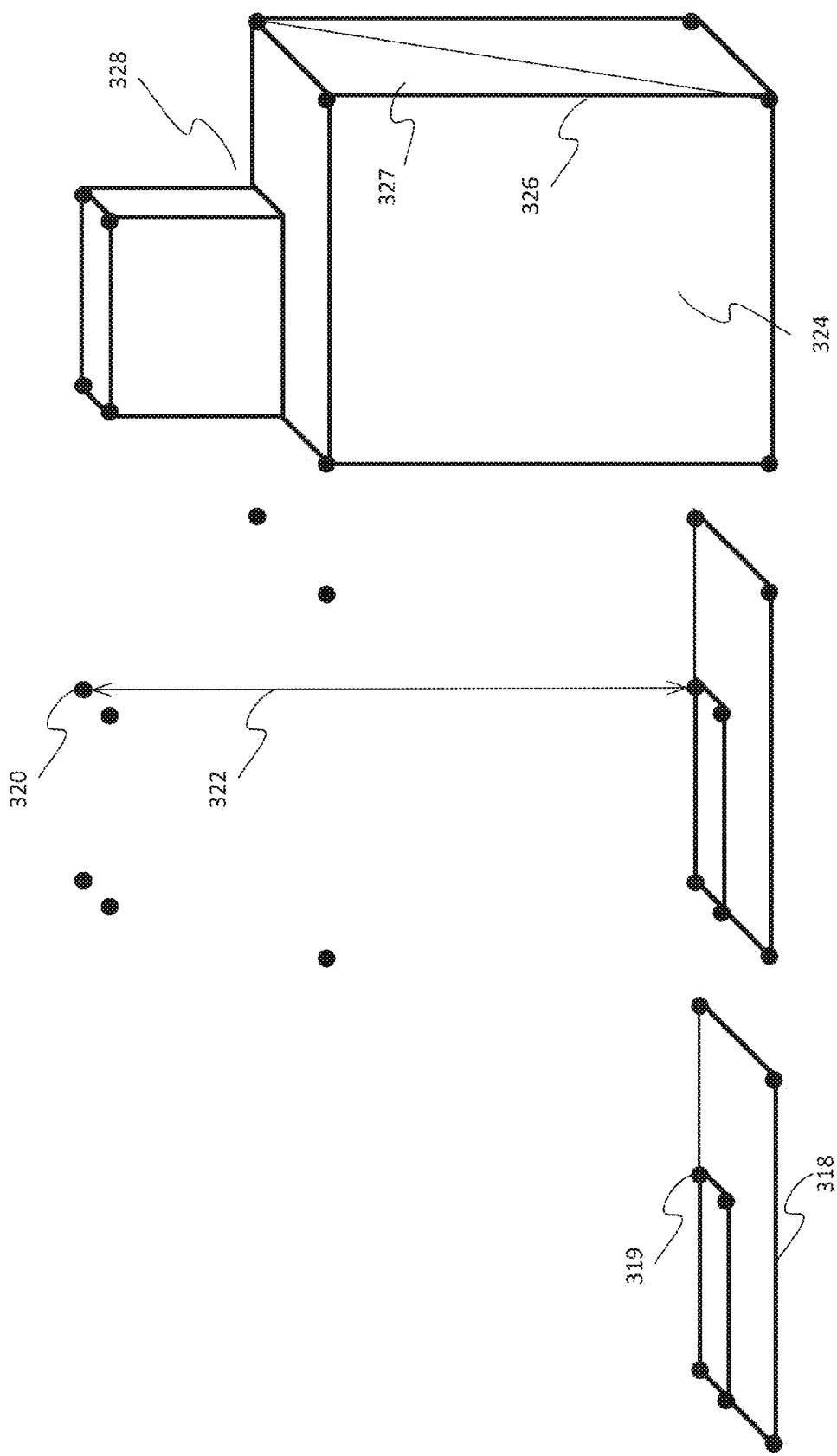
FIG. 3F depicts the creation of a 3D model from a detected shape.

FIG. 3F depicts the construction of a 3D model 328 from a detected shape 318. In an embodiment, intersection points 319 for lines of shapes, or multiple shapes, may be determined for a detected shape 318. Designated points 320 in a 3D space directly vertical of the 2D detected shape 318 intersection points 319 may be determined. The points 320 may share two coordinate values with the point 319 of the 2D shape, with a third coordinate value, or height 322, may be assigned to the designated points 320. The height 322 may correspond to the elevation value corresponding to the point 319 of the 2D shape. The height 322 may also be proportional to a scale size determined for the model 328 as it relates to the structure the model 328 will represent. As points 320 are designated, they may be connected to each other and the points 319 of the detected shape 318 with edges 326 or surfaces 324, 326 to form a 3D model 328 of a structure. Surfaces may be rectangular surfaces 324 or triangulated surfaces 327 formed by connecting points diagonally.

Figure 4:
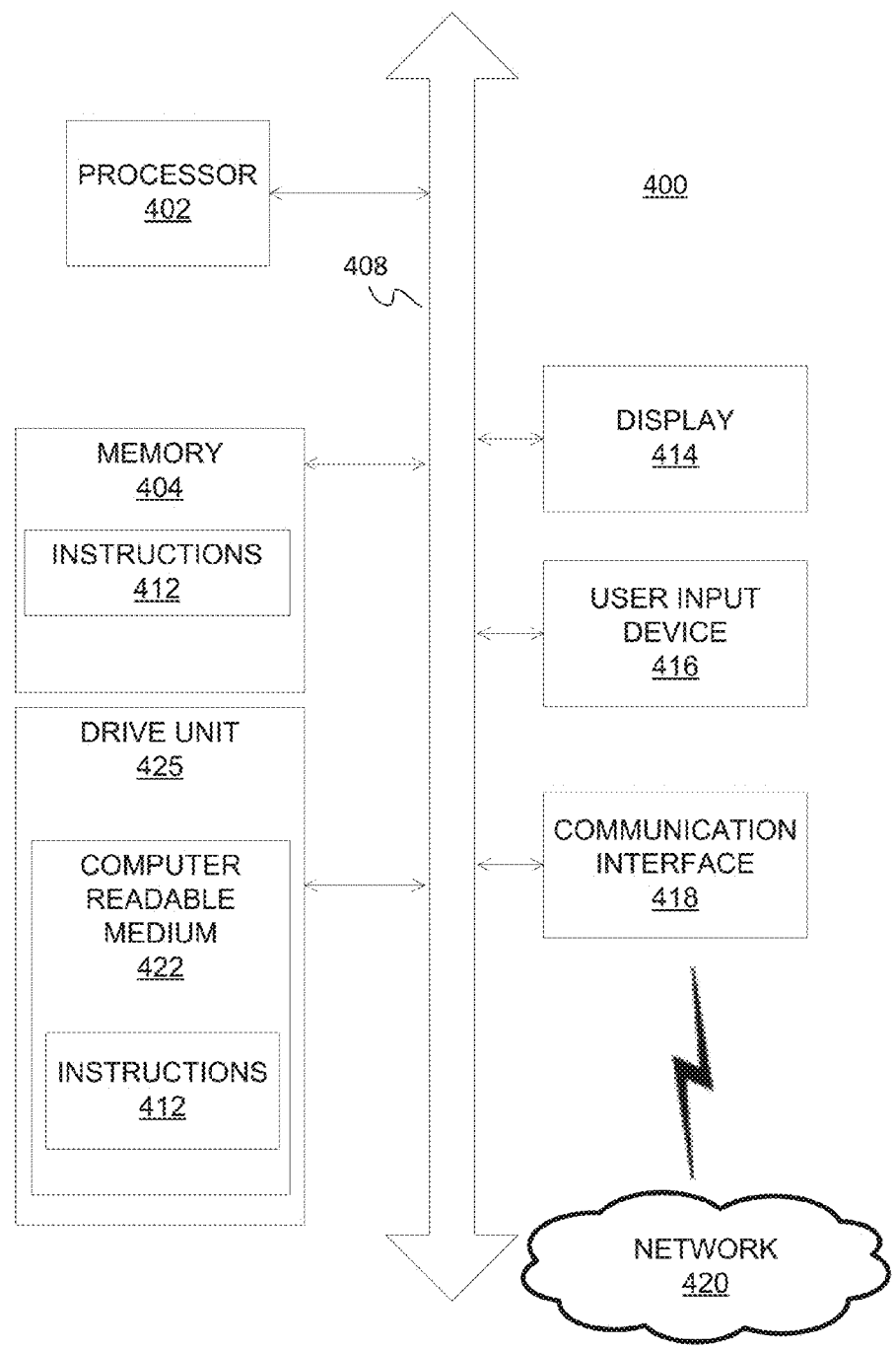
FIG. 4 depicts a system for structure model creation.

FIG. 4 provides an illustrative embodiment of a general computer system 400 for 3D model construction of a structure from a 3D surface. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the embodiments discussed above may be implemented using the computer system 400 or a component in the computer system 400.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed). In an embodiment, the processor 402 may be configured to project elevation values from a 3D surface of a geographic area into a 2D plane, and construct a 3D model of a structure in the geographic area based on the elevation values in the 2D plane.

In an embodiment, at least one processor 402 may be configured to cause the system 400 to receive a 3D surface representing a geographic area, the surface having elevation values associated with points of the surface and the geographic area comprises a structure having a geographic footprint smaller than the geographic area. At least one processor 402 may also be configured to cause the system 400 to project the elevation values into a 2D plane. At least one processor 402 may also be configured to cause the system 400 to generate an image based on the elevation values of the 2D plane. At least one processor 402 may also be configured to cause the system 400 to segment the image and detect a shape representing the geographic footprint of the structure in the geographic area from the segmented image. At least one processor 402 may also be configured to cause the system 400 to construct a 3D model of the structure by assigning heights to the shape based on the elevation vales projected into points of the 2D plane corresponding to the shape.

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital versatile disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like. In an embodiment, the memory 404 may be configured to store data representing a 3D surface of a geographic area, as well as data representing images derived from elevation values of the 3D surface and a 3D model of a structure in the geographic area.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406. In an embodiment, the display 414 may be operational to display a representation of a geographic area using 3D data points taken from the geographic area. The display 414 may also be operational to display a 3D surface representing a geographic area, images derived from elevation values of the 3D surface, as well as a 3D model of a structure in the geographic area.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400. The input device may be operational to facilitate the interaction of a user with a 3D model. The input device may also be operational to facilitate a manual segmentation of an image by a user, whereby a user manually identifies or detects edges or boundaries in the image.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly. In an embodiment, 3D data points representing a geographic area may be received by the communication interface 418 via the network 420.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. A method comprising:

receiving a three dimensional (3D) surface representing a geographic area, the surface having elevation values associated with points of the surface and the geographic area comprises a structure having a geographic footprint smaller than the geographic area;

projecting, by a processor, the elevation values into a two dimensional (2D) plane;

generating an intensity image comprising pixel values based on corresponding elevation values of the 2D plane;

segmenting the intensity image in the 2D plane to distinguish the structure from other portions of the intensity image;

detecting a shape representing the geographic footprint of the structure in the geographic area from the segmented intensity image by:

detecting a pattern representing the geographic footprint of the structure in the geographic area from the segmented intensity image;

identifying the pattern as the shape;

determining a confidence level in the identified shape based on a percentage of the shape that required extrapolation from the pattern to form the shape; and determining that the detected pattern is the identified shape if the determined confidence level is above a predetermined confidence threshold; and constructing a 3D model of the structure by assigning heights to the shape from the pixel values based on the elevation values projected into points of the 2D plane corresponding to the shape.

2. The method of claim 1, wherein constructing the 3D model of the structure comprises constructing a 3D model of a building.

3. The method of claim 1, wherein the 3D surface is a mesh comprised of triangular elements, each point of the triangular element associated with an elevation value, and wherein projecting the elevation values comprises:
   determining an elevation for the triangular elements based on an average elevation value of the points of the triangular elements; and
   assigning the average elevation value to the area of the 2D plane representing the triangular element.

4. The method of claim 3, wherein the average elevation value is assigned to a centroid of the triangular element as projected into the 2D plane.

5. The method of claim 1, wherein generating an intensity image comprises:
   generating a grayscale image, wherein smaller elevation values are shown with a darker color than larger elevation values.

6. The method of claim 1, wherein detecting a shape comprises:
   applying a shape detection algorithm to the segmented intensity image.

7. The method of claim 1, further comprising:
   constructing the 3D surface from aerial imagery.

8. The method of claim 1, wherein the pixel values are proportional to the elevation values.

9. The method of claim 1, wherein the pixel values are hue values.

10. An apparatus comprising:
    at least one processor; and
    at least one memory including computer program code;
    the at least one memory and the computer program code configured to, with the at least one processor, cause the apparatus at least to perform:
    receiving a three dimensional (3D) surface representing a geographic area, the surface having elevation values associated with points of the surface and the geographic area comprises a structure having a geographic footprint smaller than the geographic area;
    projecting the elevation values into a two dimensional (2D) plane;
    generating an intensity image comprising pixel values that are based on corresponding elevation values of the 2D plane;
    segmenting the intensity image in the 2D plane to distinguish the structure from other portions of the intensity image;
    detecting a shape representing the geographic footprint of the structure in the geographic area from the segmented intensity image by:
       detecting a pattern representing the geographic footprint of the structure in the geographic area from the segmented intensity image;
       identifying the pattern as the shape;
       determining a confidence level in the identified shape based on the percentage of the shape that required extrapolation from the pattern to form the shape; and
       determining that the detected pattern is the identified shape if the determined confidence level is above a predetermined confidence threshold; and
    constructing a 3D model of the structure by assigning heights to the shape from the pixel values based on the elevation vales projected into points of the 2D plane corresponding to the shape.

11. The apparatus of claim 10, wherein the 3D model of the structure comprises a 3D model of a building.

12. The apparatus of claim 10, wherein the 3D surface is a mesh comprised of triangular elements, each point of the triangular element associated with an elevation value, and wherein projecting the elevation values comprises:
    determining an elevation for the triangular elements based on an average elevation value of the points of the triangular elements; and
    assigning the average elevation value to the area of the 2D plane representing the triangular element.

13. The apparatus of 10, wherein the average elevation value is assigned to a centroid of the triangular element as projected into the 2D plane.

14. The apparatus of claim 10, wherein detecting a shape comprises:
    applying a shape detection algorithm to the segmented intensity image.

15. A non-transitory computer readable medium including instructions that when executed on a computer are operable to:
    receive a three dimensional (3D) surface representing a geographic area, the surface having elevation values associated with points of the surface and the geographic area comprises a structure having a geographic footprint smaller than the geographic area;
    project the elevation values into a two dimensional (2D) plane;
    generate an intensity image with pixel values based on the elevation values of the 2D plane;
    segment the intensity image in the 2D plane to distinguish the structure from other portions of the intensity image;
    detecting a shape from the segmented intensity image by:
       detecting a pattern representing the geographic footprint of the structure in the geographic area from the segmented intensity image;
       identifying the pattern as the shape;
       determining a confidence level in the identified shape based on the percentage of the shape that required extrapolation from the pattern to form the shape; and
       determining that the detected pattern is the identified shape if the determined confidence level is above a predetermined confidence threshold; and
    construct a 3D model of the structure by assigning model heights from the pixel values based on the elevation values projected into points of the 2D plane and the detected shape.

16. The medium of claim 15, wherein the 3D model of the structure comprises a 3D model of a building.

17. The medium of claim 15, wherein the 3D surface is a mesh comprised of triangular elements, each point of the triangular element associated with an elevation value, and wherein the instruction are operable to project the elevation values by:
    determining an elevation for the triangular elements based on an average elevation value of the points of the triangular elements; and
    assigning the average elevation value to the area of the 2D plane representing the triangular element.

18. The medium of 17, wherein the average elevation value is assigned to a centroid of the triangular element as projected into the 2D plane.

19. The medium of claim 15, wherein the instructions are further operable to detect the shape by:
    applying a shape detection algorithm to the image.

* * * * *